Patented Mar. 18, 1941

2,235,796

UNITED STATES PATENT OFFICE 2,235,796

PURIFICATION OF HALOGEN-CONTAINING POLYMERS

Edgar C. Britton and Fred L. Taylor, Midland, Mich., assignors to The Dow Chemical Company, Midland, Mich., a corporation of Michigan No Drawing. Application October 26, 1938, Serial No. 237,056

3 Claims. (Cl. 260—80)

This invention relates to the purification and stabilization of halogen-containing polymers. It relates particularly to a method for the removal of peroxide-containing catalyst residues, and the like, from the polymers and co-polymers of vinylidene halides and vinyl halides with one another or with other polymerizable compounds.

The vinyl halides and the vinylidene halides polymerize when heated or when exposed to the action of light. They may be made to polymerize more rapidly by adding to the monomer relatively small amounts of certain peroxides such as benzoyl peroxide, acetyl benzoyl peroxide, and the like. Another way in which the polymerization rate may be increased is to add catalytic quantities of uranium salts and subjecting the monomeric mixture to the action of sunlight or to the light from a mercury vapor lamp. After the mixture has been polymerized, the polymer or co-polymer contains catalyst residues comprising peroxide groups. When uranium salts have been employed, the catalyst residue may contain peruranates and perdiuranates, which are believed to be the salts of uranium peroxide hydrates. When such a polymer is heated, the catalyst residues decompose and, in so doing, oxidize and catalyze the decomposition of the polymer. This decomposition is evidenced by the liberation of hydrogen halides as well as by discoloration of the heated polymer. It is, therefore, difficult to prepare light-colored, thermostable, molded articles from the polymers or co-polymers of the vinyl halides or vinylidene halides, when such polymers or co-polymers have been prepared through the use of peroxides or uranium salts as catalysts.

It is, accordingly, among the objects of the present invention to provide a method whereby peroxide-containing catalyst residues may be removed from halogen-containing polymers, and especially from those of the vinyl halides or vinylidene halides. It is a further object of the invention to provide a method whereby the polymers or co-polymers of vinylidene halides or vinyl halides, individually or with other polymerizable materials, may be freed from such catalyst residues, thereby providing thermo-stable, polymeric products.

According to the invention, a halogen-containing polymer of the vinyl halide or vinylidene halide type, in finely divided form, is subjected to the action of a reducing agent in a medium which is a non-solvent wetting agent for the polymer and a solvent for the reducing agent. The treatment may be carried out at temperatures from room temperature to the boiling point of the particular wetting agent and solvent employed but below the thermal decomposition point of the polymer. The reducing agent is used in amount greater than that equivalent to the catalyst originally employed in the preparation of the polymer. The solvent employed should be one which is relatively unreactive with the reducing agent under operating conditions.

The polymers of the vinylidene halides and those of the vinyl halides are, in general, substantially insoluble in most common organic solvents. For this reason it is desirable to carry out the purification reaction with a finely divided form of the polymer so that the greatest possible advantage may be obtained from surface reaction between the reducing agent and the polymer particles. In the case of the vinylidene halide polymers, and especially those of vinylidene chloride, it has been found desirable to carry out the treatment on a polymer which will pass through a standard 50-mesh screen. Other particle sizes may, of course, be employed, it being understood that a longer time will be required with larger particles in order to effect the same degree of purification.

The following examples illustrate the practice of the invention:

Example 1

400 grams of polymeric vinylidene chloride, previously ground to a particle size of approximately 50 mesh, was covered with 2 liters of 75 per cent aqueous methanol. 20 grams of sodium bisulphite was dissolved in the liquid medium and the mixture was agitated for about 2 hours in a ball mill, after which the polymer was removed from the reaction medium by filtration, was washed with 75 per cent methanol, and finally with acetone. The resulting polymer gave no test for peroxides, although prior to treatment the polymer had given strong tests for peroxides. The purified product could be heated to temperatures considerably above its softening point (170° C.) without liberation of hydrogen chloride and without evidence of discoloration.

Example 2

A vinylidene chloride polymer which had been prepared in the presence of uranium nitrate and benzoyl peroxide as catalysts, was ground to approximately 50 mesh particle size. 400 grams of this material was suspended in a reaction medium consisting of 2 liters of methanol in which was dissolved 40 grams of oxalic acid and 10 cc.

of concentrated sulphuric acid. The methanol mixture was brought to its boiling point under reflux for 30 minutes. The so-treated polymer was separated by filtration, washed with methanol, and then with acetone, and dried. The resulting polymer was entirely free from uranates, peruranates, and peroxides. The product gave a faint test for the sulphate ion which was subsequently removed by suspending the finely divided polymer in 2 liters of boiling water, filtering, and washing. The polymer was dried at 65° C. and was found to be thermostable, both as to color and HCl liberation.

Example 3

Polymeric vinyl chloride was ground and treated in a manner analogous to that described in Example 1. The polymer before treatment was unstable at molding temperatures, liberating considerable quantities of hydrogen chloride and exhibiting darkening to a marked degree. After the bisulphite treatment, the polymer gave no tests for the peroxides which had been used as catalysts in its preparation, and could be heated to molding temperatures without discoloration or decomposition.

Example 4

A co-polymer of 70 per cent vinylidene chloride and 30 per cent vinyl chloride was treated in a manner described in Example 2. Uranium salts and peroxides employed in the polymerization reaction were completely removed by the oxalic acid-sulphuric acid treatment, and the co-polymer was molded without darkening or decomposition.

Example 5

A co-polymer of vinylidene chloride and methallyl acetate is prepared employing benzoyl peroxide as the catalyst. When co-polymerization has progressed to a point where the product is a gelatinous mass containing considerable amounts of remaining monomers, the mass as a whole is covered with the dilute methanol described in Example 1. A suitable amount of sodium bisulphite is added and the mixture is agitated in a ball mill to effect thorough mixing of the polymer and the bisulphite-containing solution. The methanol extracts the remaining monomer from the co-polymeric product which, after the treatment, is found in finely divided form. The co-polymer is separated from the dilute methanol, is washed with further quantities of methanol and finally with acetone. No traces of peroxide can be detected by analytical methods in the co-polymer.

The invention has been illustrated with reference to the use of sodium bisulphite and of oxalic acid as the reducing agents. Other reducing agents which may be employed include hydrogen sulphide or sulphur dioxide in aqueous alcohol solution, and the like. The polymers to which the process is applicable include, in addition to vinyl chloride and vinylidene chloride, all of the polymers and co-polymers of the vinylidene halides or vinyl halides with one another or with other polymerizable materials. For example, the co-polymers of the vinyl halides and the esters of acrylic and methacrylic acids may be improved as to thermo-stability by the removal of peroxide-containing catalyst residues according to the method of the present invention. The co-polymers of the vinylidene halides with the unsaturated esters of organic acids, the unsaturated aliphatic ethers, or with other vinyl or allyl polymerizable compounds may be similarly improved in properties by the method herein described.

Other modes of applying the principle of our invention may be employed instead of the one explained, change being made as regards the process herein disclosed, provided the step or steps stated by any of the following claims or the equivalent of such stated step or steps be employed.

We therefore particularly point out and distinctly claim as our invention:

1. The method which comprises subjecting a halogen-containing polymeric body in finely divided form comprising, as a major polymerized constituent, at least one member of the group consisting of the vinylidene halides and the vinyl halides to the action of a reducing agent selected from the group consisting of sodium bisulphite and an oxalic acid-sulphuric acid mixture, the said reducing agent being dissolved in a liquid non-solvent wetting agent for the polymeric body, the treatment being carried out at a temperature between room temperature and the boiling point of the liquid medium, thereby to remove peroxide-containing catalyst residues from the polymeric body.

2. The method which comprises subjecting a halogen-containing polymeric body in finely divided form comprising, as a major polymerized constituent, at least one member of the group consisting of the vinylidene halides and the vinyl halides to the action of sodium bisulphite dissolved in a liquid non-solvent wetting agent for the said polymeric body, the treatment being carried out at a temperature between room temperature and the boiling point of the liquid medium, thereby to remove peroxide-containing catalyst residues from the polymeric body.

3. The method which comprises subjecting a halogen-containing polymeric body in finely divided form comprising, as a major polymerized constituent, at least one member of the group consisting of the vinylidene halides and the vinyl halides to the action of a solution of oxalic acid and sulphuric acid in a liquid non-solvent wetting agent for the said polymeric body, the treatment being carried out at a temperature between room temperature and the boiling point of the liquid medium, thereby to remove peroxide-containing catalyst residues from the polymeric body.

EDGAR C. BRITTON.
FRED L. TAYLOR.